United States Patent [19]

Gutierrez et al.

[11] Patent Number: 4,839,072

[45] Date of Patent: Jun. 13, 1989

[54] POLYOLEFINIC SUCCINIMIDE POLYAMINE ALKYL ACETOACETATE ADDUCTS

[75] Inventors: Antonio Gutierrez, Mercerville; Robert A. Kleist, Bayonne, N.J.

[73] Assignee: Exxon Chemical Patents Inc., Linden, N.J.

[21] Appl. No.: 51,276

[22] Filed: May 18, 1987

[51] Int. Cl.[4] .......................................... C10M 133/16
[52] U.S. Cl. ................................ 252/51.5 A; 548/545; 548/546; 548/547
[58] Field of Search .................. 252/51.5 A; 548/546, 548/547

[56] References Cited

U.S. PATENT DOCUMENTS

| | | | |
|---|---|---|---|
| 3,215,707 | 11/1965 | Rense et al. | 260/326.3 |
| 3,280,034 | 10/1966 | Anzenberger et al. | 252/51.5 |
| 3,301,826 | 1/1967 | Tawney | 548/547 |
| 3,390,086 | 6/1968 | O'Halloran | 252/47.5 |
| 3,455,831 | 7/1969 | Davis | 252/51.5 |
| 3,455,832 | 7/1969 | Davis | 252/51.5 |
| 3,888,773 | 6/1975 | Nnadi et al. | 252/37.2 |
| 3,927,041 | 12/1975 | Cengel et al. | 260/346.8 |
| 4,062,786 | 12/1977 | Brois et al. | 252/51.5 |
| 4,113,639 | 9/1978 | Lonstrup et al. | 252/51.5 |
| 4,116,876 | 9/1978 | Brois et al. | 252/49.6 |
| 4,123,373 | 10/1978 | Brois et al. | 252/48.6 |
| 4,234,435 | 11/1980 | Meinhardt et al. | 252/51.5 |
| 4,375,974 | 3/1983 | Maldonado et al. | 44/63 |
| 4,447,348 | 5/1984 | Forsberg | 252/75 |
| 4,521,318 | 6/1985 | Karol | 252/46.7 |
| 4,548,724 | 10/1988 | Karol et al. | 252/51.5 |
| 4,579,674 | 4/1986 | Schlicht | 548/546 |
| 4,579,675 | 4/1986 | Sawicki et al. | 252/51.5 |
| 4,612,132 | 9/1986 | Wollenberg et al. | 252/51.5 A |
| 4,614,603 | 9/1986 | Wollenberg | 252/51.5 A |

OTHER PUBLICATIONS

C. V. Smalheer et al., *Chemistry of Additives*, Section I, Introduction, "Lubricant Additives", 1967, The Lezius-Hilles Co., Cleveland, Ohio, pp. 1–11.

G. O. Torosyan et al., *Institute of Organic Chemistry*, Academy of Sciences of the Armenian SSR, Translated from Zhurnal Organischeskoi Khimii, vol. 18, "Amines and Ammonium Compounds. CLX, Amides of Acetoacetic Acid", pp. 1229–1231.

*Primary Examiner*—William R. Dixon, Jr.
*Assistant Examiner*—Ellen M. McAvoy
*Attorney, Agent, or Firm*—E. T. Wheelock; J. B. Murray, Jr.

[57] ABSTRACT

This invention is to polyolefinic succinimide polyamine alkyl acetoacetate of the general formula:

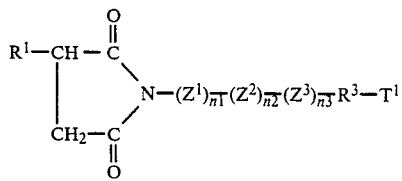

wherein $Z^1$ and $Z^3$ are the same or different and are moieties of the formula:

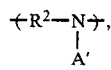

$Z^2$ is a moiety of the formula:

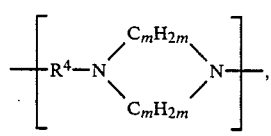

wherein $R^2$, $R^3$ and $R^4$ are the same or different and are alkylene of from 1 to 6 carbon atoms, m is an integer of from 1 to 5, each A' is independently selected from the group consisting of H, A and the moiety:

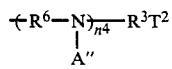

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

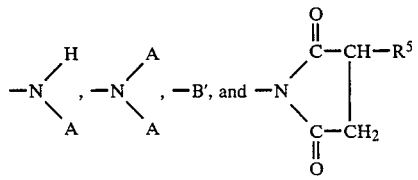

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($M_n$) between about 200 and 3,500, and wherein A comprises a tautomeric substituent of the formula:

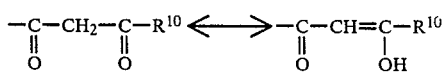

wherein $R^{10}$ is substituted or unsubstituted alkyl or aryl containing group, with the proviso that at least one of the A' or A" groups comprises the tautomeric substituent.

59 Claims, No Drawings

POLYOLEFINIC SUCCINIMIDE POLYAMINE ALKYL ACETOACETATE ADDUCTS

CROSS-REFERENCE TO RELATED APPLICATIONS

This application is related to the following applications, all filed on even date herewith: Attorney Ser. No. 51,275, filed May 18, 1987, "Polyolefinic Succinimide Polyamine Alkyl Acetoacetate and Substituted Acetate Adducts as Additives in Lubricating Oil Compositions"; Ser. No. 51,146, filed May 18, 1987 "Polyolefinic Succinimide Polyamine Alkyl Acetoacetate Adduct Dispersants"; and Ser. No. 51,273 filed May 18, 1981, "Polyolefinic Succinimide Polyamine Alkyl Acetoacetate Adducts as Dispersants in Lubricating Oil Composition."

FIELD OF THE INVENTION

This invention is to polyolefinic succinimide polyamine alkyl acetoacetate adducts of the general formula:

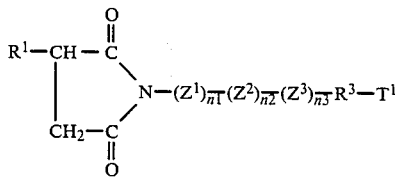

wherein $Z^1$ and $Z^3$ are the same or different and are moieties of the formula:

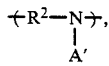

$Z^2$ is a moiety of the formula:

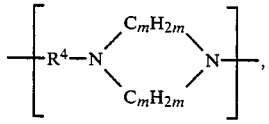

wherein $R^2$, $R^3$ and $R^4$ are the same or different and are alkylene of from 1 to 6 carbon atoms, m is an integer of from 1 to 5, each A' is independently selected from the group consisting of H, A and the moiety:

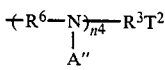

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

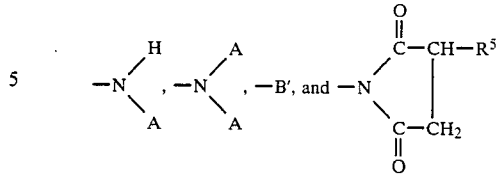

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 200 and 3,500, and wherein A comprises a tautomeric substituent of the formula:

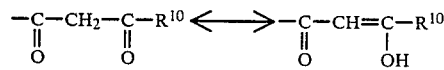

wherein $R^{10}$ is substituted or unsubstituted alkyl or aryl containing group, with the proviso that at least one of the A' or A" groups comprises said tautomeric substituent.

These materials are oil soluble and are useful as additives (particularly as dispersants) in oleaginous compositions, including lubricating oils and fuels.

BACKGROUND OF THE INVENTION

Polyalkene substituted carboxylic acids are widely known and used as additives in lubricating oils.

Illustrations of such materials are shown in numerous patents.

U.S. Pat. No. 3,215,707 discloses the reaction of chlorine with a mixture of polyolefin, having molecular weights up to about 50,000, and maleic anhydride.

U.S. Pat. No. 3,927,041 discloses the reaction of 300 to 3,000 molecular weight polybutene with a dicarboxylic acid or anhydride to form materials which can be used per se, or as esters, amides, imides, and amidines, or the like in petroleum products.

U.S. Pat. No. 4,062,786 provides an example (No. 13) of a polyisobutylene succinic anhydride having a molecular weight of about 1300, a saponification number of about 100, and about 1.25 succinic anhydride units per polyisobutylene unit.

U.S. Pat. No. 4,123,373 shows a similar material having a molecular weight of about 1,400, a saponification number of 80, and about 1.07 succinic anhydride units per polyisobutylene unit.

U.S. Pat. No. 4,234,435 also shows polyalkene substituted dicarboxylic acids derived from polyalkenes having an average molecular weight of 1,300 to 5,000.

Polyalkenyl succinic anhydrides have also been reacted with polyamines to form materials suitable for use as dispersants in lubricating oils.

U.S. Pat. Nos. 4,113,639 and 4,116,876 provide examples of alkenyl succinic anhydride in which the molecular weight of the alkenyl unit is about 1,300, the saponification number is about 103, and contain 1.3 succinic anhydride units per hydrocarbon molecule. The material is then reacted with a polyamine and boric acid ('639) or with an amino alcohol and boric acid ('876).

U.S. Pat. No. 4,548,724 teaches a lubricating oil additive which is the reaction product of a polycarboxylic acid, e.g., 1,3,6-hexane carboxylic acid, with a polyisobutylene succinimide and a polyamine.

U.S. Pat. No. 4,579,675 relates to the reaction products of polyalkylene succinimide (derived from polyethylene-polyamines) and 1,3-dicarbonyl compounds. However, the reaction temperatures are such that the products are materials known as N-substituted enaminones. Therefore, polyisobutenyl succinimide, derived from polyisobutenyl succinic anhydride and diethylenetriamine, was reacted with ethyl acetoacetate at 110° C. to form the corresponding N-substituted enaminone. Sulfonic acid is included in the reaction mixture to ensure the presence of the enaminones. The by-product of this process is water rather than the alcohols produced by the inventive process disclosed herein. The enaminone reaction products are said to have detergent/dispersant properties when included in a lubricating oil composition.

No known disclosure teaches the products disclosed and claimed herein.

SUMMARY OF THE INVENTION

This invention is to polyolefinic succinimide polyamine alkyl acetoacetate adducts of the general formula:

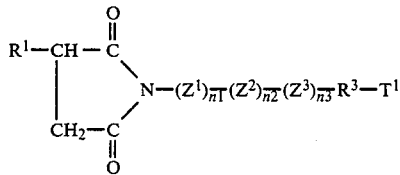

wherein $Z^1$ and $Z^3$ are the same or different and are moities of the formula:

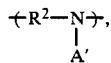

$Z^2$ is a moiety of the formula:

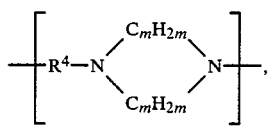

wherein $R^2$, $R^3$ and $R^4$ are the same or different and are alkylene of from 1 to 6 carbon atoms, m is an integer of from 1 to 5, each A' is independently selected from the group consisting of H, A and the moiety:

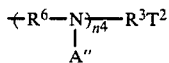

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

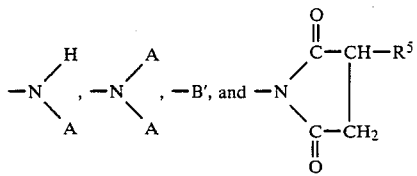

wherein B' is substituted or unsubstituted alkyl or aryl-containing group, $n^1$ is an integer of 0 to 10, $n^2$ is an integer of 0 to 10, $n^2$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 200 and 3,500, and wherein A comprises a tautomeric substituent of the formula:

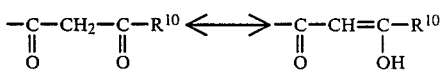

wherein $R^{10}$ is substituted or unsubstituted alkyl or aryl containing group, with the proviso that at least one of the A' or A" groups comprises said tautomeric substituent.

Also included in the invention are mixtures of adducts fitting the above description, particularly mixtures containing adducts in which the $T^1$ and/or $T^2$ substituent is both the amide and the succinimide.

These materials are useful as dispersants, detergents, friction modifiers, antirust agents, metal passivators, heating oil stabilizers, and as compatability aids in the prevention of interaction between the various components of additive packages used in producing motor oils and in the lubricating oils themselves.

DETAILED DESCRIPTION OF THE INVENTION

As has been noted before, this invention is to polyolefinic succinimide polyamine alkyl acetoacetate adducts of the general formula (I):

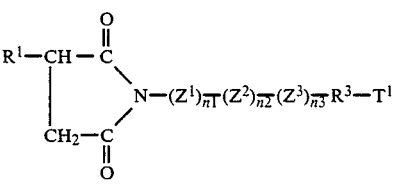

wherein $Z^1$ and $Z^3$ are the same or different and are moities of the formula:

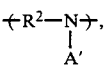

$Z^2$ is a moiety of the formula:

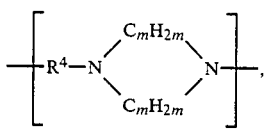

wherein $R^2$, $R^3$ and $R^4$ are the same or different and are alkylene of from 1 to 6 carbon atoms, m is an integer of from 1 to 5, each A' is independently selected from the group consisting of H, A and the moiety:

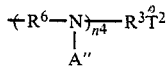

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

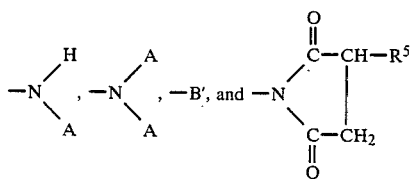

wherein B" is substituted or unsubstituted alkyl or aryl-containing group, $n^1$ is an integer of to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 200 and 3,500, and wherein A comprises a tautomeric substituent of the formula (Ia):

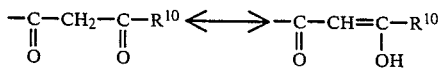

wherein $R^{10}$ is substituted or unsubstituted alkyl or aryl containing group, with the proviso that at least one of the A' or A" groups comprises said tautomeric substituent.

The $R_1$ and $R_5$ groups may be the same or different and may be olefinic polymeric residues produced from $C_2$ to $C_{10}$ mono-olefins. Such olefins may be ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers are those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene, etc.

The olefin polymer may be completely saturated as in the example of an ethylene-propylene copolymer made by Ziegler-Natta synthesis using hydrogen as a moderator to control molecular weight.

The olefinic polymer may have number average molecular weights within the range of about 200 and about 3,500. Depending upon the adducts ultimate use, $\overline{M}_n$ may lie between 650 and 3,500, more usually between about 900 and about 2,500. Particularly useful olefin polymers have number average molecular weights with the range of about 1,300 and about 2,200 with approximately one double bond per polymer chain. An especially useful starting material is polyisobutylene.

The $R^2$, $R^4$ and $R^6$ groups are alkyl linkages having from 1 to 6 carbon atoms. The preferred linkage is a $C_2$ to $C_4$ link (e.g., $-CH_2-$, $-CH_2CH_2-$, $-C_3H_6-$ and $-C_4H_8-$). Most preferred is an ethylene linkage ($-CH_2CH_2-$).

Preferably, when $n^2$ is zero, the value of $n^1$ is from 1 to 5, $n^3$ is from 0 to 5, and $n^4$ is from 0 to 5, and the sum of integers $n^1$, $n^3$ and $n^4$ is preferably from 2 to 10, and more preferably from 3 to 7. When $n^2$ is not zero, preferably each A' is independently selected from H or A and the value of $n^1$ is from 1 to 5, $n^2$ is from 1 to 3, $n^3$ is from 0 to 5, and the total of integers $n^1$, $n^2$ and $n^3$ is from 2 to 10, and more preferably from 3 to 7.

The $R^{10}$ group may be a substituted or unsubstituted alkyl or aryl-containing group but desirably is a lower alkyl having 1 to 4 carbon atoms, and preferably is a methyl group.

As noted above, $T^1$ and $T^2$ may be amide-groups of the formula:

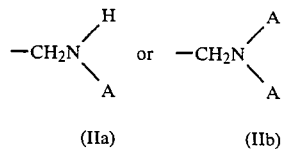

or the polyolefin substituted succinimide-containing groups of the formula:

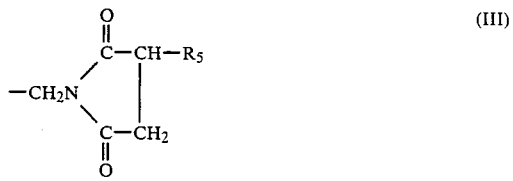

or a substituted or unsubstituted aryl or alkyl group, e.g., alkaryl of 7 to 10 carbon atoms, alkyl of 1 to 25 carbon atoms, preferably of 1 to 6 carbon atoms.

Mixtures of adducts fitting the above description in which the molar ratio of adduct molecules having the amide ($T^1$ and/or $T^2$) substituent to total adduct molecules (i.e., those having both the amide and the succinimide substituent) of from 0 to 1:1, are within the scope of the invention. More desirable are mixtures wherein such ratios are in the range of from about 0 to 0.5:1, and most desirable is from about 0 to 0.05:1. Preferred are the above mixtures of adducts wherein at least about 50% of the $T^1$ and $T^2$ groups comprise a succinimide moiety of formula III above.

These adducts may be made in a variety of ways. Certain portions of the reaction scheme are believed to be important in producing the described molecule. Those steps will be highlighted at appropriate junctures.

The step in this process which produces certain of the above adducts is the reaction of an alkyl acetoacetate:

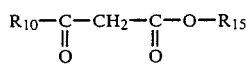 (IV)

or an alkyl thioacetate:

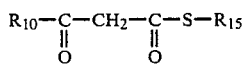 (V)

wherein $R_{10}$ is as defined above and $R^{15}$ is H or is a substituted or unsubstituted alkyl or aryl but preferably is a lower alkyl (e.g., $C_1$ to $C_6$ alkyl), with a long chain polyolefinic dicarboxylic acid which has been aminated with a polyamine. This reaction should be practiced at a temperature sufficiently high to produce substantial amounts of the tautomeric keto-enol rather than the enaminone.

Methods for producing the long chain polyolefinic dicarboxylic acid substrate and the subsequent amination are known.

For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8, preferably 3 to 7 wt. % chlorine, or bromine, based on the weight of polymer, by passing the chlorine or bromine through the polyolefin at a temperature of 60 to 250, e.g., 120 to 160° C. for about 0.5 to 10, preferably 1 to 7 hours. The halogenated polymer may then be reacted with sufficient unsaturated acid or anhydride at 100° C. to 250° C., usually about 180° to 220° C. for about 0.5 to 10, e.g., 3 to 8 hours, so the product obtained will contain about 1.2 to 2.0, preferably 1.3 to 1.8, e.g., 1.6 moles, of the unsaturated acid per mole of the halogenated polymer. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. No. 1,440,219.

By the use of halogen, about 65 to 95 wt. % of the polyolefin, e.g., polyisobutylene, will normally react with the dicarboxylic acid material. Upon carrying out a thermal reaction without the use of halogen or a catalyst, usually only about 50 to 75 wt. % of the polyisobutylene will react. Chlorination helps increase the reactivity. For convenience, the aforesaid functionality ratios of dicarboxylic acid producing units to polyolefin of 1.2 to 2.0, 1.3 to 1.8, and 1.4 to 1.7 are based upon the total amount of polyolefin, that is, the total of both the reacted and unreacted polyolefin, used to make the product. Such long chain polyolefinic dicarboxylic acid substrates can be illustrated by compounds of the formula:

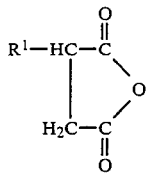 (VI)

wherein $R^1$ is as defined above, or the corresponding diacid

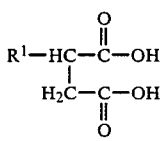 (VII)

wherein $R^1$ is as defined above, or mixtures thereof.

Amino compounds useful for neutralization of the thus produced polyolefinic dicarboxylic acid are:

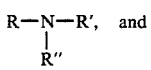 (VIII)

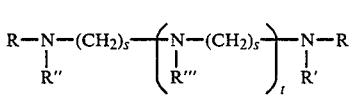 (IX)

wherein R, R', R" and R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R''' can additionally comprise a moiety of the formula:

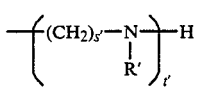 (X)

wherein R' is as defined above, and wherein each s and s' can be the same or a different number of from 2 to 6, preferable 2 to 4; and t and t' can be the same or different and each numbers of typically from 0 to 10, preferably about 2 to 7, most preferably about 3 to 7, with the proviso that t+t' is not greater than 10. To assure a facile reaction, it is preferred that R, R', R", R''', s, s', t and t' be selected in a manner sufficient to provide the compounds of Formulas VIII and IX with typically at least one primary or secondary amine group, preferably at least two primary or secondary amine groups. This can be achieved by selecting at least one of said R, R', R" or R''' groups to be hydrogen or by letting t in Formula IX be at least one when R''' is H or when the X moiety possesses a secondary amino group. The most preferred amines of the above formulas are represented by Formula Ib and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene) triamine; N,N-dimethyl-1,3-diaminopropane and N,N-di(2-aminoethyl) ethylene diamine.

Other useful amine compounds include: alicyclic diamines such as 1,4-di(aminomethyl) cyclohexane, and heterocyclic nitrogen compounds such as imidazolines, and N-aminoalkyl piperazines of the general formula:

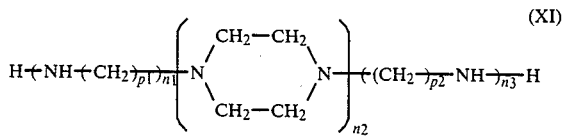
(XI)

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; and mixtures thereof.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and corresponding piperazines. Low cost poly(ethyleneamines)-compounds average about 5 to 7 nitrogen atoms per molecule are available commercially under trade names such as "Polyamine H," "Polyamine 400," "Dow Polyamine E-100," etc. Useful amines also include polyoxyalkylene polyamines such as those of the formulae:

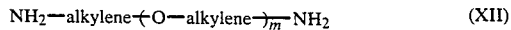
(XII)

wherein "m" has a value of about 3 to 70 and preferably 10 to 35; and

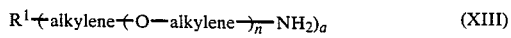
(XIII)

where "n" has a value of about 1 to 40, with the provision that the sum of all the n's is from about 3 to about 70, and preferably from about 6 to about 35, and $R^1$ is a substituted saturated hydrocarbon radical of up to 10 carbon atoms, wherein the number of substituents on the R group is represented by the value of "a", which is a number from 3 to 6. The alkylene groups in either formula (XII) or (XIII) may be straight or branched chains containing about 2 to 7, and preferably about 2 to 4 carbon atoms.

The polyoxyalkylene polyamines of formulas (XII) or (XIII) above, preferably polyoxyalkylene diamines and polyoxyalkylene triamines, may have number average molecular weights ranging from about 200 to about 4000 and preferably from about 400 to about 2000. The preferred polyoxyalkylene polyamines include the polyoxyethylene and polyoxypropylene diamines and the polyoxypropylene tri-amines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The amine is readily reacted with the polyolefinic dicarboxylic acid material by heating an oil solution containing 5 to 95 wt. % of dicarboxylic acid material to about 100° to 250° C., preferably 125° to 175° C., generally for 1 to 10, e.g., 2 to 6, hours until the desired amount of water is removed. The heating is preferably carried out to favor formulation of imides or mixtures of imides and amides, rather than amides and salts. Reaction ratios of dicarboxylic acid material to equivalents of amine as well as the other nucleophilic reactants described herein can vary considerably, depending upon the reactants and type of bonds formed. Generally from 0.1 to 1.0, preferably about 0.2 to 0.6, e.g., 0.4 to 0.6, moles of dicarboxylic acid moiety content (e.g. grafted maleic anhydride content) is used, per equivalent of nucleophilic reactant, e.g. amine. For example, about 0.8 mole of a pentamine (having two primary amino groups and 5 equivalents of nitrogen per molecule) is preferably used to convert into a mixture of amides and imides, the product formed by reacting one mole of olefin with sufficient maleic anhydride to add 1.6 moles of succinic anhydride groups per mole of olefin, i.e. preferably the pentamine is used in an amount sufficient to provide about 0.4 mole (that is $1.6 \div [0.8 \times 5]$ mole) of succinic anhydride moiety per nitrogen equivalent of the amine.

Exemplary of amines employed are members selected from the group consisting of compounds of the formulae:

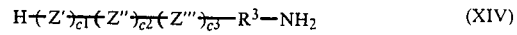
(XIV)

wherein $Z'$ and $Z''$ are the same or different and are moieties of the formula

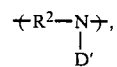

$Z''$ is a moiety of the formula

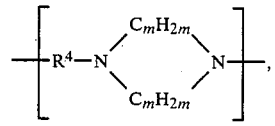

wherein $R^2$, $R^3$ and $R^4$ are the same or different and are alkylene of from 1 to 6 carbon atoms, m is an integer of from 1 to 5, each $D'$ is independently selected from the group consisting of H and the moiety

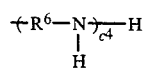

wherein $R^6$ is alkylene of from 1 to 6 carbon atoms, $c^1$ is an integer of from 0 to 10, $c^2$ is an integer of from 0 to 10, $c^3$ is an integer of from 0 to 10, $c^4$ is an integer of from 0 to 10, with the provisos that the sum of $c^1$, $c^2$, $c^3$ and $c^4$ is from 3 to 10, and the sum of $C^1$, $C^3$ and $C^4$ is at least one.

The resulting aminated polyolefinic dicarboxylic acid substrate materials can be generically illustrated by compounds of the formula (XV):

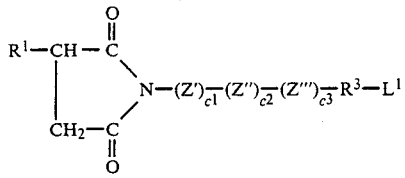

wherein Z' and Z''' are the same or different and are moieties of the formula:

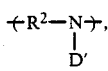

Z'' is a moiety of the formula:

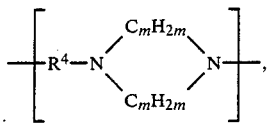

wherein $R^2$, $R^3$ and $R^4$ are the same or different and are alkylene of from 1 to 6 carbon atoms, m is an integer of from 1 to 5, each D' is independently selected from the group consisting of H and the moiety:

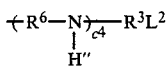

wherein $R^3$ is as defined above, $R^6$ is alkylene of from 1 to 6 carbon atoms, $L^1$ and $L^2$ are the same or different and each comprises a member selected from the group consisting of moieties of the formula

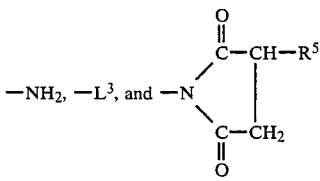

wherein $L^3$ is substituted or unsubstituted alkyl or aryl-containing group, $c^1$ is an integer of from 0 to 10, $c^2$ is an integer of from 0 to 10, $c^3$ is an integer of from 0 to 10, $c^4$ is an integer of from 0 to 10, with the provisos that the sum of $c^1$, $c^2$, $c^3$ and $c^4$ is from 3 to 10, and the sum of $C^1$, $C^3$ and $C^4$ is at least one.

The resulting aminated polyolefinic dicarboxylic acid substrate materials prepared from polyalkylene polyamines can be illustrated by the general formula (XVI):

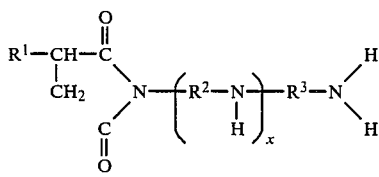

or

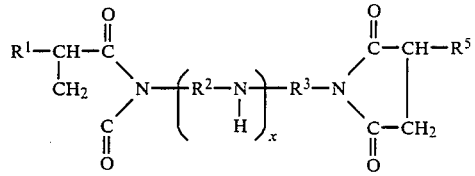

wherein x is an integer of 1 to 10.

Typically, they will be produced in mixtures of the two.

The polyolefinic dicarboxylic acid material, after amination, is then reacted with an alkyl acetoacetate of the formula:

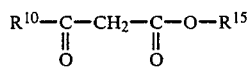

or an alkyl thioacetate of the formula:

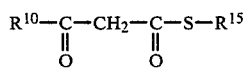

The reaction is carried out at a temperature high enough substantially to minimize the production of the enaminone and form, instead, the keto-enol tautomer. Temperatures of about 120° to 220° C. will be generally used, with 150° to 180° C. being preferred. Temperatures of at least about 150° C. are preferred to meet this goal although proper choice of temperature depends on many factors, including reactants, concentration, reaction solvent choice, etc. The reaction of the animated polyolefinic dicarboxylic acid material and the alkyl acetonate and the alkyl thioacetate will liberate the corresponding $HOR^{15}$ and $HSR^{15}$ by-products, respectively. Preferably, such by-products are substantially removed, as by distillation or stripping with an inert gas (such as $N_2$), prior to use of the adduct as described herein. Such distillation and stripping steps are conveniently performed at elevated temperature, e.g., at the selected reaction temperature (for example, at 150° C. or higher).

The amount of alkyl aceto-acetate and/or alkyl thioacetate reactants used can vary widely, and is preferably selected so as to avoid substantial excesses of these reactants. Generally, these reactants are used in a reactant:amine nitrogen-equivalent molar ratio of from about 0.1 to 1:1, and preferably from about 0.5 to 1:1, wherein the moles of amine nitrogen-equivalent is the moles of secondary nitrogens plus twice the moles of primary nitrogens in the animated polyolefinic dicarboxylic acid material (e.g., PIBSA-PAM) which is thus contacted with the alkyl acetonate or alkyl thioacetate. The reaction should also be conducted in the substantial absence of strong acids (e.g., mineral acids, such as HCl, $HB_2$, $H_2SO_4$, $H_3PO_3$ and the like, and sulfonic acids, such as para-toluene sulfonic acids) to avoid the undesired side-reactions and decrease in yield to the adducts of this invention.

An alternative method of synthesizing the inventive adduct is one in which, in a first step, the above-noted amine compounds are first reacted with the listed alkyl acetoacetates or alkyl thioacetates, to form an amino compound substituted by at least one tautomeric substituent of the formula:

(XVII)

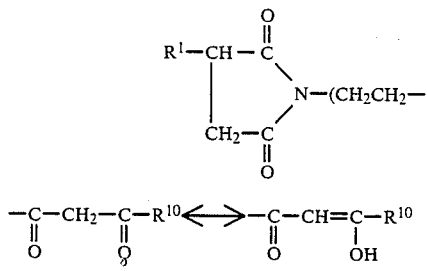

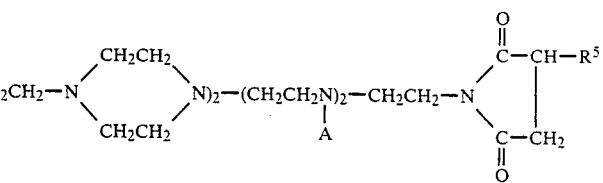

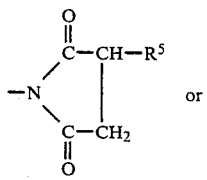

wherein $R^{10}$ is as defined above. The resulting material, in a second step, may then be reacted with the polyolefinic dicarboxylic acid material. The first step may be done by simply mixing the reactant amine (or amino compound as described above) and alkyl acetoacetates at a temperature of from about 120° C. 220° C., preferably at least about 150° C., more preferably 150° to 180° C. A neutral diluent such as mineral oil may be used but is not needed. As in the first above-mentioned method, it is preferable to distill and/or use inert gas stripping (e.g., with $N_2$), at elevated temperatures, to substantially remove by-product $HOR^{15}$ or $HSR^{15}$ from the amine-alkyl acetoacetate (or alkyl thioacetate) reaction mixture, and the reaction should be conducted in the substantial absence of strong acids. The second step desirably takes place in a neutral diluent such as a mineral oil at a temperature between 120° and 230° C., for a time of 1 to 10 hours. The temperature is not particularly critical but takes place at a higher rate at the higher temperature range, e.g., at least about 150° C.

The adducts of this invention may be treated by boration as generally taught in U.S. Pat. Nos. 3,087,936 and 3,254,024 (which are incorporated by reference). This is accomplished by treating the adduct with a boron compound selected from boron oxide, boron halides, boron acids, and esters of boron acids in an amount sufficient to provide from about 0.1 to about 20 atomic proportions of boron for each mole of adduct. Desirably those proportions will be from 0.05 to 2.0 weight percent, e.g., 0.05 to 0.7 weight percent, boron based on the total weight of the adduct.

Treating may be carried out by adding from about 0.05 to 4 weight percent of the boron compound (preferably boric acid) to the adduct and heating while stirring between 135° to 190° C. The time of reaction may be 1 to 5 hours. Nitrogen stripping may be used during or after the reaction.

Exemplary of adducts of this invention derived from cyclic alkylene polyamines are adducts of the formula I wherein $n^1$, $n^2$ and $n^3$ are each integers of 1 to 3, $R^2$ and $R^4$ are each $C_2$ to $C_4$ alkylene, A' is A, $n^4$ is an integer of 1 to 3, $R^3$ is $-CH_2CH_2-$, $T^1$ is

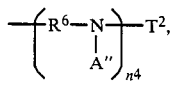

$-NH(A)$, A is the tautomeric substituent of formula Ia wherein $R^{10}$ is $C_1$ to $C_2$ alkyl, and wherein $R^1$ and $R^5$ are the same or different and are polyalkylene having $\overline{M}_n$ of from 1,500 to 3,000. Illustrative of such adducts are those of the formula (XVIII):

wherein $R^1$, $R^5$ and A are as defined in the prior sentence.

Exemplary of adducts of this invention derived from straight and branched chain polyalkylene polyamines are adducts of formula I wherein $N^2$ is zero, $n^1$ and $n^3$ are each integers of 1 to 3, $R^2$ is $C_2$ to $C_4$ alkylene, each A' is:

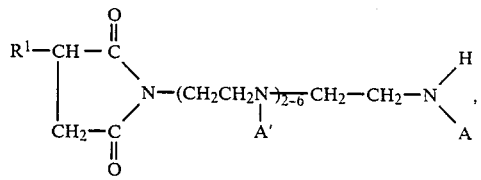

$R^3$ is $-CH_2CH_2-$, $n^4$ is an integer of 1 to 3, $R^6$ is $C_2$ to $C_4$ alkylene, $T^1$ and $T^2$ as defined in formula I, A is the tautomeric substituent of formula Ia wherein $R^{10}$ is $C_1$ to $C_2$ alkyl, and $R^1$ and $R^5$ are the same or different and are polyalkylene having $\overline{M}_n$ of from 1,500 to 3,000. Exemplary of adducts derived from such branched chain polyalkylene polyamines are those of the formula (XIX):

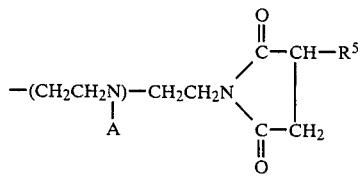

wherein A' is:

Adducts of this invention derived from straight chain polyalkylene polyamines are preferred, and are illustrated by adducts having formula (XIX) above, except that A' is H.

Exemplary of preferred compatibilizer adducts of this invention are:

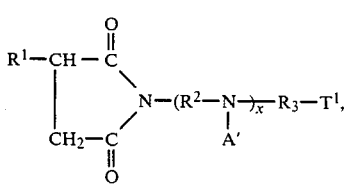

wherein A' is A, and wherein $R^1$, $R^2$, $R^3$, A and $T^1$ are as defined in Table I.

TABLE I

| $R^1$ | x | $R^2$ | $R^3$ | $R^{10}$ of Each A(1) | $T^1$ |
|---|---|---|---|---|---|
| derived from: | | | | | |
| polyisobutylene $\overline{M}_n = 700$ | 5 | $-C_2H_4-$ | $-CH_2CH_2-$ | $-CH_3$ | $-NH(A)$, $R^{10} = -CH_3$ |
| polyisobutylene $\overline{M}_n = 2,200$ | 3 | $-CH_2-$ | $-C_3H_6-$ | $-C_2H_5$ | $-NH(A)$, $R^{10} = -C_2H_5$ |
| polybutene $\overline{M}_n = 1,200$ | 4 | $-C_5H_{10}-$ | $-C_4H_8-$ | $-H$ | $-NH(A)_2$, $R^{10} = -H$ |
| polybutene $\overline{M}_n = 4,000$ | 2 | $-C_2H_4-$ | $-C_2H_4-$ | $-C_2H_5$ | $-NH(A)_2$, $R^{10} = -C_2H_5$ |
| polypentene $\overline{M}_n = 1,800$ | 5 | $-C_3H_6-$ | $-C_3H_6-$ | $-C_4H_9$ | $-N(A)_2$, $R^{10} = -C_4H_9$ |
| ethylene-propylene co-polymer $\overline{M}_n = 3,000$ | 2 | $-C_2H_4-$ | $-C_2H_4-$ | $-CH_3$ | $-N\begin{matrix}H\\A\end{matrix}$, $R^{10} = -CH_3$ |
| polyisobutylene $\overline{M}_n = 1,500$ | 2 | $-C_2H_4-$ | $-C_2H_4-$ | $-CH_3$ | (2) |

(1) Wherein A = the tautomeric substituent of formula Ia.

(2) $T^1 = -N\begin{matrix}C(O)-CH-R^5\\ \\ C(O)-CH_2\end{matrix}$ wherein $R^5$ = polyisobutylene, $\overline{M}_n = 1,500$ As noted above, these adducts are useful as dispersants in lubricating oil formulations. They also may be used to allow the combination of various other, typically incompatible, additives in lubricating oil formulations of the additive packages used to produce those formulations.

This invention is further illustrated by the examples which follow, wherein parts are by weight unless otherwise indicated. The examples are not intended to limit the scope of the invention in any way.

PRODUCTION OF PIBSA-AMINES

Example 1

A polyisobutenyl succinic anhydride (PIBSA) having an SA:PIB ratio of 1.31 succinic anhydride (SA) moieties per polyisobutylene (PIB) molecule of 1300 $\overline{M}_n$ was prepared by heating a mixture of 100 parts of polyisobutylene with 13 parts of maleic anhydride to a temperature of about 220° C. When the temperature reached 120° C., chlorine addition was begun and 105 parts were added during a period of 5 hours. The reaction mixture was then heat soaked at 220° C. ofr about 1.5 hours and stripped with nitrogen for about one hour. The resulting PIBSA had a saponification number of 103. The PIBSA was diluted with mineral oil solvent 150 neutral. The diluted PIBSA analyzed for a SAP of 70 and 59 wt. % active ingredient.

The PIBSA was aminated as follows: 2000 grams (1.3 moles) of the PIBSA and 860 grams of S150N lubricating oil were mixed in a reaction flask and heated to about 149° C. Then, 182 grams of tetraethyleneamine (TEPA) was added dropwise and the mixture was heated at 150° C. for three hours while nitrogen sparging. The product (PIBSA-TEPA) was filtered and found to have a nitrogen content of 2.04 wt. %.

Example 2

A PIBSA having an SA:PIB ratio of 1.04 succinic anhydride (SA) moieties per polyisobutylene (PIB) molecules of 940 $\overline{M}_n$ was prepared by heating a mixture of 100 parts of PIB with 13 parts of maleic anhydride to a temperature of about 220° C. When the temperature reached 120° C., chlorine addition was begun and 10.5 parts of chlorine were added for a period of five hours. The reaction mixture was then heat soaked at 220° C. for about 1.5 hours and then stripped with nitrogen for about 1 hour. The resulting PIBSA had a saponification number of 112. The product was 90 weight percent active ingredient.

The product was aminated as follows: 900 parts of the PIBSA, 800 parts of toluene and 131 parts of TEPA were heated to the azeotrope temperature (130° C.) for 2 hours. The reaction mixture was heated to 150° C. while stripping the toluene with nitrogen for about 2 hours. The filtered product was found to have a nitrogen content of 4.29 wt. %. The product was diluted with S150N oil to produce a dilute mixture containing 2.12 wt. % N.

Example 3

A mixture of 1298 parts by weight of the PIBSA starting material of Example 2, 1435 parts of mineral oil was heated to 150° C. Then, 161 parts of tetraethylene pentamine were added dropwise while stirring and light nitrogen sparging. The mixture was nitrogen stripped at 150° C. for 3 hours and then filtered. The oil solution was found to have a nitrogen content of 2.12 wt. %.

REACTION WITH ALKYL ACETOACETATE

Example 4

About 152 parts by weight of the PIBSA-TEPA product from Example 1 and 6.5 parts of ethylacetoacetate were heated to 160° C. with refluxing for 2 hours. The temperature was then raised to 180° C. while the by-product ethanol distilled off. The reaction product was stripped with nitrogen for one hour.

Example 5

The procedure of Example 4 was again used except that 13 parts of ethylacetoacetate were added.

Example 6

The procedure of Example 4 was again used except that 19.5 parts of ethylacetoacetate were added.

Example 7

A mixture of 298 parts by weight of the PIBSA-TEPA material produced in Example 3 and 13 parts of ethylacetoacetate, and 8.4 grams of S150N oil was heated to 160° C. with refluxing for 2 hours. The temperature was then raised to 180° C. while ethanol was distilled off. The reaction product was stripped with nitrogen for one hour.

Example 8

The procedure as in Example 7 was again used except that 26 parts of ethylacetoacetate and 12.6 parts of S150N oil were added.

Example 9

The procedure as in Example 7 was again used except that 39 parts of ethylacetoacetate and 25.2 parts of S150N oil were added.

COMPARATIVE EXAMPLES

The following examples were carried out to demonstrate that the activity of the products of the invention is due primarily to the chelating ability of the tautomeric keto-enol form of the inventive adduct molecule and not merely to the presence of high amide content.

Example 10

About 149 parts by weight of the material of Example 3, 5.9 parts of acetic anhydride, and 2.8 parts of S150N oil were heated to 100° C. for 2 hours. The temperature was then raised to 200° C. and the product was stripped with nitrogen for 15 minutes. The product was then filtered.

Example 11

The procedure of Example 8 was again used except that 11.8 parts of acetic anhydride (in place of the alkyl acetoacetate) and 5.6 parts of S150N oil were added.

Example 12

The procedure of Example 8 was again used except that 17.7 parts of acetic anhydride (in place of the alkyl acetoacetate) and 8.85 parts of S150N oil were added.

The mixtures of adducts with neutral oil found in inventive Examples 7, 8 and 9 (molar ratio of EAA/TEPA, respectively, 1:1, 2:1, 3:1) and Comparative Examples 10, 11 and 12 (molar ratios or acetic anhydride/TEPA, respectively, 1:1, 2:1, 3:1) were subjected to two bench tests--VIB (varnish inhibition test) and SIB (sludge inhibition test). The VIB test provides an indication of how well a formulation will inhibit varnish during operation of an engine using the formulation as a lubricant. Similarly, the SIB test gives a prediction of how well the formulation will inhibit the formation of sludge.

The SIB and VIB tests forecast the performance of a lubricant in a gasoline engine.

The SIB test employs a used crankcase mineral lubricating oil composition (having an original viscosity of about 325 SUS at 37.8° C.) which has been used in a taxicab driven generally only for short trips. This causes a buildup of sludge precursors. The oil used contains only a refined base mineral oil, a viscosity index improver, a pour point depressant and zinc dialkyldithiophosphate antiwear additives. The oil contains no sludge dispersants. Such oil is acquired by draining and refilling taxicab crankcases at about 1000–2000 mile intervals.

The SIB test is conducted in the following manner: the used crankcase oil is freed of sludge by centrifuging for one half hour at about 39,000 gravities (gs). The resulting clear bright red oil is then decanted from the separated insoluble particles. However, the supernatant oil still contains oil-soluble sludge precursors which (under the conditions employed by the SIB test) tend to form additional oil-insoluble deposits of sludge. The sludge inhibiting properties of the additive being tested is determined by adding to the used oil, 0.5 wt. % on an active basis, of the particular additive being tested. Ten grams of the sample tested is then placed in a stainless steel centrifuge tube and heated at 140° C. for 16 hours in the presence of air. Following the heating, the tube containing oil is cooled and centrifuged for 30 minutes at about 39,000 gs. Any deposits of new sludge that form in this step are separated from the decanting supernatant oil and then carefully washed with 15 ml. of pentane to remove all remaining oils. The weight of the new solid sludge that forms in the test in milligrams) is determined (after drying the residue) by weighing it. The results are reported as milligrams of sludge per ten grams of oil. Differences as small as one part per ten thousand can be measured. The less new sludge formed, obviously the more effective is the additive as a dispersant. In other words, if the additive is effective, it will maintain in suspension, during centrifugation, a portion of the new sludge that forms on heating and oxidation.

In the VIB test, a test sample consisting of ten grams of lubricating oil containing 0.5 wt. % (on an active basis) of the additive being evaluated is used. The test oil is a lubricating oil obtained from a taxi which has been operated for about 2000 miles with the lubricating oil. The sample is heat soaked overnight at about 140° C. and thereafter centrifuged to remove the sludge. The supernatant fluid is subjected to heat cycling from about 150° C. to room temperature over a period of 3.5 hours at a frequency of about two cycles per minute. During the heating phase, a gas containing a mixture of 0.7 volume percent SO$_2$, 1.4 volume percent NO and the balance air is bubbled through the test sample; during the cooling phase, water vapor is bubbled through the sample. At the end of the test period, (which testing cycle can be repeated as necessary to determine the inhibiting effect of any additive,) the wall surfaces of the test flasks in which the samples are visually evaluated for varnish inhibition. The amount of varnish deposited on the walls is rated at values of from one to eleven with the higher number being the greater amount of varnish. This test also forecasts the varnish results obtained as a consequence of carrying out the ASTM MS-VD engine tests.

Table II shows the results of these comparative tests.

TABLE II
REACTION WITH EAA VERSUS ACETIC ANHYDRIDE BENCH TEST RESULTS

| DISPERSANT | EX. 7 | EX. 10 | EX. 8 | EX. 11 | EX. 9 | EX. 12 |
|---|---|---|---|---|---|---|
| EAA/PAM Mole RATIO (INVENTION) | 1 | — | 2 | — | 3 | — |
| AC$_2$O/PAM MOLE RATIO (COMPARISON) | — | 1 | — | 2 | — | 3 |
| SIB (0 IS BEST) | 1.24 | 2.82 | 1.78 | 2.94 | 1.88 | 2.35 |
| VIB (1 IS BEST) | 5 | 7 | 5 | 9 | 6 | 9 |

Comparison of each of the pairs of formulations shows that, in each case, both the VIB and SIB test results of the inventive EAA adduct is superior to the acetic anhydride adduct. It is believed that the chelating ability of the inventive adduct EAA moiety, i.e.,

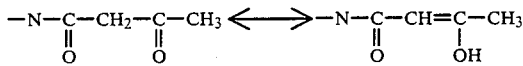

improves the SIB and VIB values.

The formulations of the inventive adducts (Ex. 4,5,6) and the PIBSA-TEPA of Ex. 1 were subjected to SIB and VIB tests. The results are shown in Table III.

TABLE III

| DISPERSANT | EAA/TEPA MOLAR RATIO | SIB | VIB |
|---|---|---|---|
| EX. 4 | 1 | 4.55 | 4 |
| EX. 5 | 2 | 3.95 | 4½ |
| EX. 6 | 3 | 0.0 | 4 |
| EX. 1 (Control) | 0 | 4.31 | 5½ |

In the series of SIB tests, as the EAA/TEPA ratio increases, the SIB value decreases to 0.0. The VIB value remains at a superior value. It is clear that the EAA provides the superior results when compared to the basic non-adduct PIBSA-TEPA.

PRE-REACTION OF EAA ADDUCTS

Several inventive PIBSA-PAM-EAA adducts were produced either by an alternative procedure in which the EAA was reacted with a polyamine (PAM) prior to reaction with the PIBSA or with the procedures exemplified above. These were compared to controls which were not adducts. The PIBSA-PAM materials were largely bis-succinimides.

Example 13

About 200 g (0.16 mole) of a PIBSA of a number average molecular weight of 1300 and a saponification number of 90.4 (90.5% active ingredient) was combined with 176 g of mineral oil solvent 150 neutral and heated to 150° C. while stirring under a nitrogen blanket. Then 16.7 g (0.87 mole) of a polyamine bottoms was added dropwise and the reaction mixture was heated at 150° C. for two hours; followed by 0.5 hour of nitrogen stripping. The product was filtered and had a viscosity of 225 cSt at 100° C. The resulting bis-succinimide analyzed for 1.46 weight % N.

Example 14

About 200 g (0.16 mole) of a PIBSA of a number average molecular weight of 1300 and a saponification number of 90.4 (90.5% active ingredient) was combined with 203 g of S150N mineral oil and heated to 150° C. while stirring under a nitrogen blanket. Then, 16.7 grams (0.087 mole) of PAM was added dropwise and the reaction mixture was soaked at 150° C. for 2 hours. The mixture was stripped for 0.5 hours with nitrogen. Thereafter, 33.8 g (0.26 mole) of EAA was added and the reaction mixture was heated to 160° C. for two hours. The 50% oil solution was nitrogen stripped to remove ethanol for 0.5 hour and filtered. This product had a viscosity of 331 cSt at 100° C. and analyzed for 1.37 weight % N.

Example 15

About 33.8 g (0.26 mole) of EAA were mixed with 16.7 g (0.087 mole) of PAM and heated to 150° C. for 2 hours. The reaction mixture was nitrogen stripped to distill off the ethanol by-product. About 203 g of S150N mineral oil, and 200 g of a PIBSA made from a PIB having a $\overline{M}_n$ of 1300 and a saponification number of 90.4 (active ingredient 90.5%) were added and the mixture heated to 150° C. The reaction product was heat soaked at 150° C. for 2 hours with N$_2$ sparging and filtered. This product had a viscosity of 419 cSt and contained 1.36 weight % N.

Example 16

About 200 g (1.06 mole) of a PIBSA of number average molecular weight of 1900 and a saponification number of 59.6 (78.9 active ingredient) was dissolved in 138.0 g of S150N mineral oil and heated to 150° C. Then, 10.8 g (0.056 mole) of PAM was added dropwise. The reaction mixture was heated at 150° C. for 2 hours; followed by 0.5 hour of nitrogen stripping. The filtered 50% oil solution had a viscosity of 504 cSt and contained 1.05 weight % N.

Example 17

About 200 g of the PIBSA employed in Example 13 was diluted with 151 g of S150N mineral oil and heated to 150° C. while stirring under a nitrogen blanket. Then, 10.8 g (0.056 mole) of PAM was added dropwise. The reaction mixture was heated at 150° C. for 2 hours while nitrogen sparging. Then, 21.8 g. (0.16 mole) of EAA was added and the product heated at 150° C. for 2 hours, followed by 0.5 hour of nitrogen stripping to remove the ethanol formed. The 50% oil solution was filtered. This product had a viscosity of 800 cSt and analyzed for 0.99 weight % N.

Example 18

About 21.8 g (0.164 mole) of EAA and 10.8 g (0.056 mole) of PAM were mixed and heated to 150° C. for 2 hours. The ethanol was nitrogen stripped for 0.5 hour and the residue diluted with 151 g of S150N mineral oil. About 200 g (0.106 mole) of the PIBSA of Example 14 was added and the mixture was heated to 150° C. for 2 hours. The reaction product was then stripped with N$_2$ for 0.5 hour and filtered. The 50% oil solution had a viscosity of 994 cSt and analyzed for 0.99 weight % N.

The materials produced in Examples 13 to 18 were subjected to VIB and SIB tests. The results are shown in Table IV.

The SIB and VIB test results are superior to the controls in either event.

BORATED PIBSA-PAM-EAA

Two samples of the inventive PIBSA-PAM-EAA were borated.

Example 19

3000 g of a PIBSA-PAM dispersant, based on a 950 $\overline{M}_n$ PIB and a PIBSA to PAM molar ratio of 2.1:1, was charged to a reactor. The reactor was heated to 100° C. and 278.5 g of ethyl acetoacetate was added. The reactor was then heat soaked for 1 hour. The temperature was raised to 160° C. for 2 hours. The reactor was then sparged with $N_2$ to remove ethanol.

At 160° C., 68 g of boric acid was added slowly. The reaction was heat soaked for 2 hours with $N_2$ stripping. The product was filtered, and was found to contain 1.56 wt. % N and 0.391 wt. % boron.

TABLE IV

| EXAMPLE | SIB | VIB |
|---|---|---|
| 13 (Control) | 3.95 | 4 |
| 14 (Post-reacted) | 1.35 | 3 |
| 15 (Pre-reacted) | 2.19 | 3 |
| 16 (Control) | 3.43 | 5 |
| 17 (Post-reacted) | 2.15 | 4 |
| 18 (Pre-reacted) | 1.63 | 4 |

Example 20

3000 g of a PIBSA-PAM dispersant, based on a PIB $\overline{M}_n$ of 2250 and a PIBSA:PAM ratio of 1.9:1, was charged to reactor. The reactor was heated to 100° C. and 178.1 g of EAA added. The reaction was heat soaked at 100° C. for 1 hour. The temperature was then raised to 160° C. under $N_2$ blanket for 2 hours and stripped at 160° C. for 0.5 hour to remove ethanol.

At 165° C., 45 g of boric acid was added slowly with light $N_2$ stripping. After conclusion of the boric acid addition, the reactor was heat soaked for 2 hours. The product, after filtering, was found to contain 0.98 wt. % N and 0.5 wt. % boron.

PRODUCTION OF ENAMINONE VERSUS THE INVENTIVE EAA ADDUCT

A model study was performed to show that the reaction temperature controlled the product produced by the synthesis procedure.

Example 21

About 13.0 g (0.1 mole) of EAA was dissolved in 100 ml of anhydrous ether and 8.7 g (0.1 mole) of morpholine was added dropwise while keeping the reaction temperature at 20° C. Once the addition was completed, the reaction mixture was stirred at room temperature overnight. The ether was evaporated and the crude product analyzed. Proton NMR and $C^{13}$ NMR indicated the formation of the corresponding enaminone in quantitative yield according to the reaction:

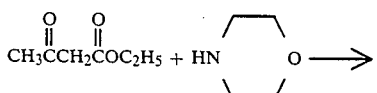

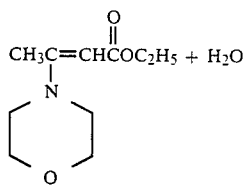

Example 22

About 13.0 g (0.1 mole) of EAA and 8.7 g (0.1 mole) of morpholine were mixed in a reaction flask and heated to 120° C. for one hour. Thereafter the reaction temperature was raised to 180° C. allowing ethyl alcohol to distill off while the temperature rose to 180° C. About 4.5 g of a liquid which analyzed by GC to be ethanol was obtained by distillation. The residue was allowed to cool to room temperature and a solid was obtained. The crude yield of the solid was 16.1 g. The solid was recrystalized from ether and analyzed. The proton NMR showed no proton signals for the —O—$CH_2CH_3$ group. The structure of the morpholide of acetoacetic acid as a tautomeric form was confirmed via proton and carbon ($C^{13}$) NMR.

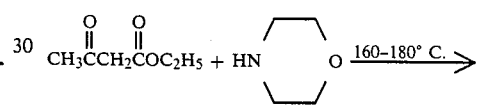

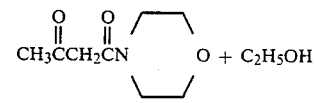

The presence of alcohol as a by-product and the absence of the proton NMR signal for —O—$C_2H_5$ for the material made at the higher temperature shows that the procedure employed by U.S. Pat. No. 4,579,675 produces a significantly different product than those disclosed here.

Having described the invention by direct disclosure and by examples, certain variation should be apparent to those having ordinary skill in the art, which variation would be considered to be equivalent to the invention claimed below.

We claim as our invention:

1. An adduct of the formula:

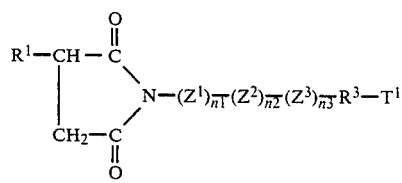

wherein $Z^1$ and $Z^3$ are the same or different and are moities of the formula:

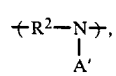

$Z^2$ is a moiety of the formula:

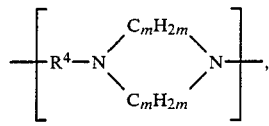

wherein $R^2$, $R^3$ and $R^4$ are the same or different and are alkylene of from 1 to 6 carbon atoms, m is an integer of from 1 to 5, each A' is independently selected from the group consisting of H, A and the moiety:

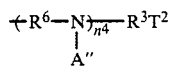

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

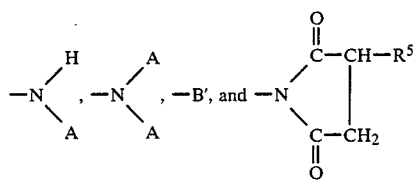

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 200 and 3,500, and wherein A comprises a tautomeric substituent of the formula:

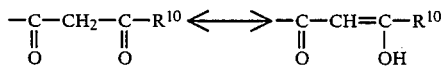

wherein $R^{10}$ is substituted or unsubstituted alkyl or aryl containing group, with the proviso that at least one of the A' or A" groups comprises said tautomeric substituent.

2. The adduct of claim 1 wherein $R^1$ and $R^5$ are polyisobutylene.

3. The adduct of claim 2 wherein the polyisobutylene has a $\overline{M}_n$ between about 900 and about 2,500.

4. The adduct of claim 3 wherein the polyisobutylene has a $\overline{M}_n$ between about 1,300 and about 2,200.

5. The adduct of claim 2 wherein $R^2$, $R^4$ and $R^6$ are each alkylene of from 2 to 4 carbon atoms.

6. The adduct of claim 5 wherein $R^2$, $R^4$ and $R^6$ are each —CH$_2$CH$_2$—.

7. The adduct of claim 2 wherein $n^2$ is zero and the sum of $n^1$, $n^3$ and $n^4$ is from 3 to 7.

8. The adduct of claim 6 wherein $n^2$ is zero and the sum of $n^1$, $n^3$ and $n^4$ is from 3 to 7.

9. The adduct of claim 1 wherein $R^{10}$ is a methyl group.

10. The adduct of claim 2 wherein $R^{10}$ is a methyl group.

11. The adduct of claim 6 wherein $R^{10}$ is a methyl group.

12. The adduct of claim 8 wherein $R^{10}$ is a methyl group.

13. The adduct of claim 1 which has been borated.

14. The adduct of claim 3 which has been borated.

15. The adduct of claim 8 which has been borated.

16. Mixtures of adducts having the formulae:

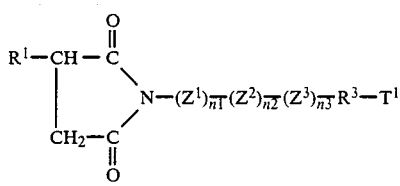

wherein $Z^1$ and $Z^3$ are the same or different and are moieties of the formula:

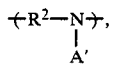

$Z^2$ is a moiety of the formula:

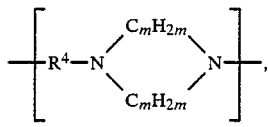

wherein $R^2$, $R^3$ and $R^4$ are the same or different and are alkylene of from 1 to 6 carbon atoms, m is an integer of from 1 to 5, each A' is independently selected from the group consisting of H, A and the moiety:

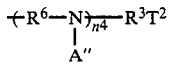

wherein A" is H or A, $R^3$ is as defined above, $R^6$ is alkylidene of from 1 to 6 carbon atoms, $T^1$ and $T^2$ are the same or different and each comprises a member selected from the group consisting of moieties of the formula:

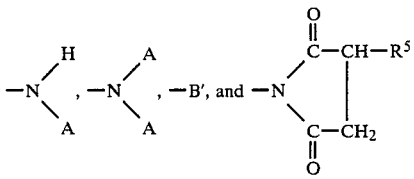

wherein B' is substituted or unsubstituted aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 200 and 3,500, and wherein A comprises a tautomeric substituent of the formula:

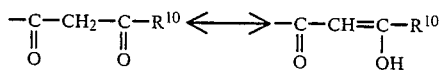

wherein $R^{10}$ is substituted or unsubstituted alkyl or aryl containing group, with the proviso that at least one of the A' or A" groups comprises said tautomeric substituent.

17. The mixture of claim 16 wherein $R^1$ and $R^5$ are polyisobutylene.

18. The mixture of claim 17 wherein the polyisobutylene has $\overline{M}_n$ between about 900 and about 2,500.

19. The mixture of claim 18 wherein the polyisobutylene has $\overline{M}_n$ between about 1,300 and about 2,700.

20. The mixture of claim 17 wherein $R^2$, $R^4$ and $R^6$ are each alkylidene of from 2 to 4 carbon atoms.

21. The mixture of claim 20 wherein $R^2$, $R^4$ and $R^6$ are each —$CH_2CH_2$—.

22. The mixture of claim 17 wherein $n^2$ is zero and the sum of $n^1$, $n^3$ and $n^4$ is from 3 to 7.

23. The mixture of claim 21 wherein $n^2$ is zero and the sum of $n^1$, $n^3$ and $n^4$ is from 3 to 7.

24. The mixture of claim 16 wherein $R^{10}$ is a methyl group.

25. The mixture of claim 17 wherein $R^{10}$ is a methyl group.

26. The mixture of claim 18 wherein $R^{10}$ is a methyl group.

27. The mixture of claim 23 wherein $R^{10}$ is a methyl group.

28. The mixture of claim 16 wherein at least about 50% of $T^1$ and $T^2$ groups in adduct dispersants comprise said succinimide moiety of the formula

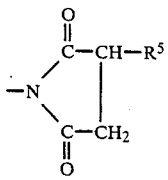

wherein $R^5$ is as defined above.

29. The mixture of claim 16 which has been borated.
30. The mixture of claim 17 which has been borated.
31. The mixture of claim 26 which has been borated.
32. A method for the production of adducts having the formula:

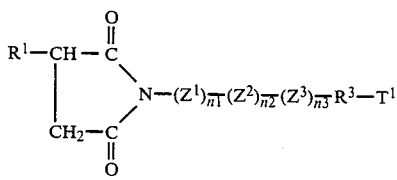

wherein $Z^1$ and $Z^3$ are the same or different and are moities of the formula:

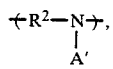

$Z^2$ is a moiety of the formula:

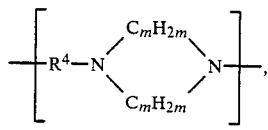

wherein $R^2$, $R^3$ and $R^4$ are the same or different and are alkylene of from 1 to 6 carbon atoms, m is an integer of from 1 to 5, each A' is independently selected from the group consisting of H, A and the moiety:

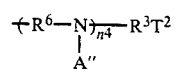

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

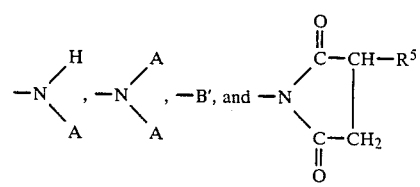

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 200 and 3,500, and wherein A comprises a tautomeric substituent of the formula:

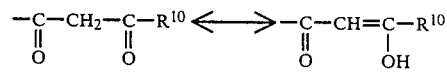

wherein $R^{10}$ is substituted or unsubstituted alkyl or aryl containing group, with the proviso that at least one of the A' or A" groups comprises said tautomeric substituent, comprising the steps of:

(a) reacting, at a reaction temperature sufficiently high to produce a substantial conversion to the adduct (i) an alkyl acetoacetate or alkyl thioacetate, respectfully of the formulae:

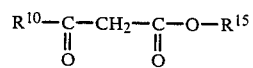

or

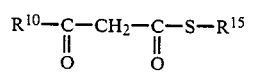

wherein $R^{10}$ is as defined above and $R^{15}$ is a substituted or unsubstituted alkyl or aryl containing group, with (ii) at least one polyolefinic dicarboxylic acid substrate material selected from the formula:

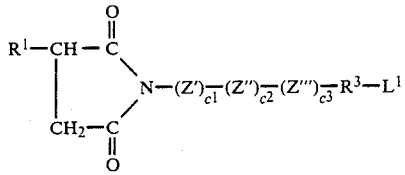

wherein $Z'$ and $Z'''$ are the same or different and are moieties of the formula:

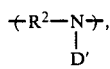

$Z''$ is a moiety of the formula:

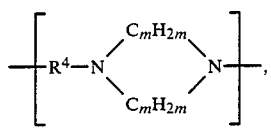

wherein $R^2$, $R^3$ and $R^4$ are the same or different and are alkylene of from 1 to 6 carbon atoms, m is an integer of from 1 to 5, each $D'$ is independently selected from the group consisting of H and the moiety:

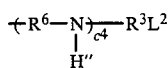

wherein $R^3$ is as defined above, $R^6$ is alkylene of from 1 to 6 carbon atoms, $L^1$ and $L^2$ are the same or different and each comprises a member selected from the group consisting of moieties of the formula:

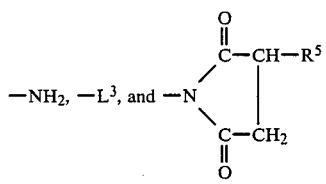

wherein $L^3$ is substituted or unsubstituted alkyl or aryl-containing group, $c^1$ is an integer of from 0 to 10, $c^2$ is an integer of from 0 to 10, $c^3$ is an integer of from 0 to 10, $c^4$ is an integer of from 0 to 10, with the provisos that the sum of $c^1$, $c^2$, $c^3$ and $c^4$ is from 3 to 10, and the sum of $C^1$, $c^3$ and $C^4$ is at least one; and (b) recovering said adducts.

33. The method of claim 32 wherein the reaction temperature is at least about 150° C.

34. The method of claim 32 wherein the reaction takes place in an inert solvent.

35. The process of claim 32 wherein $R^1$ and $R^5$ are polyisobutylene.

36. The process of claim 35 wherein the polyisobutylene has a $\overline{M}_n$ between about 900 and about 2,500.

37. The process of claim 36 wherein the polyisobutylene has $\overline{M}_n$ between about 1,300 and about 2,200.

38. The process of claim 35 wherein $R^2$, $R^4$ and $R^6$ are each alkylene of from 2 to 4 carbon atoms.

39. The process of claim 38 wherein $R^2$, $R^4$ and $R^6$ are each $-CH_2CH_2-$.

40. The process of claim 35 wherein $c^2$ is zero and the sum of $c^1$, $c^3$ and $c^4$ is from 3 to 7.

41. The process of claim 39 wherein $c^2$ is zero and the sum of $c^1$, $c^3$ and $c^4$ is from 3 to 7.

42. The process of claim 32 wherein $R^{10}$ is a methyl group.

43. The process of claim 33 wherein $R^{10}$ is a methyl group.

44. The process of claim 35 wherein $R^{10}$ is a methyl group.

45. The process of claim 36 wherein $R^{10}$ is a methyl group.

46. A method for the production of adducts having the formula:

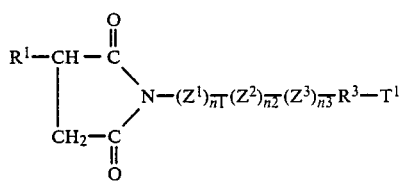

wherein $Z^1$ and $Z^3$ are the same or different and are moieties of the formula:

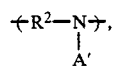

$Z^2$ is a moiety of the formula:

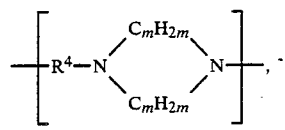

wherein $R^2$, $R^3$ and $R^4$ are the same or different and are alkylene of from 1 to 6 carbon atoms, m is an integer of from 1 to 5, each $A'$ is independently selected from the group consisting of H, A and the moiety:

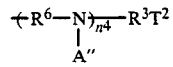

wherein $A''$ is H or A, $R^3$ is as defined above, $R^6$ is alkylene of from 1 to 6 carbon atoms, $T^1$ and $T^2$ are the same or different and each comprises a member selected from the group consisting of moieties of the formula:

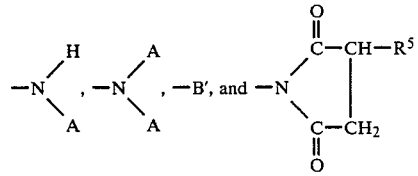

wherein $B'$ is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 200 and 3,500, and wherein A comprises a tautomeric substituent of the formula:

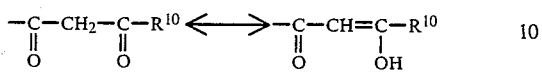

wherein $R^{10}$ is substituted or unsubstituted alkyl or aryl containing group, with the proviso that at least one of the A' or A" groups comprises said tautomeric substituent, comprising the steps of:

(a) reacting, at a reaction temperature sufficiently high to produce a substantial conversion to the adduct, (i) an alkyl acetoacetate or alkyl thioacetate, respectfully of the formulae:

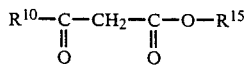

or

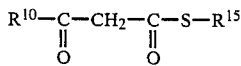

wherein $R^{10}$ is as defined above and $R^{15}$ is a substituted or unsubstituted alkyl or aryl containing group, with (ii) at least one amino compound selected from the group consisting of compounds of the formulae:

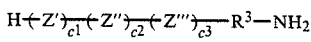

wherein Z' and Z" are the same or different and are moieties of the formula

Z" is a moiety of the formula

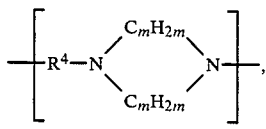

wherein $R^2$, $R^3$ and $R^4$ are the same or different and are alkylene of from 1 to 6 carbon atoms, m is an integer of from 1 to 5, each D' is independently selected from the group consisting of H and the moiety

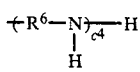

wherein $R^6$ is alkylene of from 1 to 6 carbon atoms, $c^1$ is an integer of from 0 to 10, $c^2$ is an integer of from 0 to 10, $c^3$ is an integer of from 0 to 10, $c^4$ is an integer of from 0 to 10, with the provisos that the sum of $c^1$, $c^2$, $c^3$ and $c^4$ is from 3 to 10, and the sum of $C^1$, $C^3$ and $C^4$ is at least 1, to form an amino compound substituted by at least one tautomeric substituent of the formula

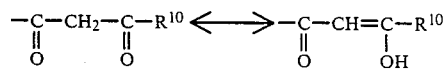

wherein $R^{10}$ is as defined above, and (b) contacting said substituted amino compound with at least one of a long chain polyolefinic dicarboxylic acid substrate of the formula

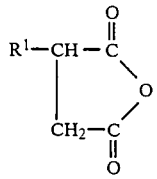

or the corresponding diacid

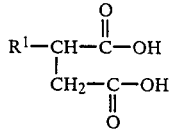

wherein $R^1$ is as defined above, at a temperature of from about 100° to 230° C., to form said adducts, and recovering said adducts.

47. The method of claim 46 wherein step (a) is performed at a reaction temperature of at least about 150° C.

48. The method of claim 46 wherein the reactions of steps (a) and (b) are effected in an inert solvent.

49. The process of claim 46 wherein $R^1$ and $R^5$ are polyisobutylene.

50. The process of claim 49 wherein the polyisobutylene has a $\overline{M}_n$ between about 900 and about 2,500.

51. The process of claim 50 wherein the polyisobutylene has $\overline{M}_n$ between about 1,300 and about 2,200.

52. The process of claim 49 wherein $R^2$, $R^4$ and $R^6$ each are alkylene of from 2 to 4 carbon atoms.

53. The process of claim 52 wherein $R^2$, $R^4$ and $R^6$ are each $-CH_2CH_2-$.

54. The process of claim 49 wherein $c^2$ is zero and the sum of $c^1$, $c^3$ and $c^4$ is from 3 to 7.

55. The process of claim 53 wherein $c^2$ is zero and the sum of $c^1$, $c^3$ and $c^4$ is from 3 to 7.

56. The process of claim 46 wherein $R^{10}$ is a methyl group.

57. The process of claim 47 wherein $R^{10}$ is a methyl group.

58. The process of claim 49 wherein $R^{10}$ is a methyl group.

59. The process of claim 50 wherein $R^{10}$ is a methyl group.

* * * * *